United States Patent [19]

Thunker et al.

[11] Patent Number: 5,456,217
[45] Date of Patent: Oct. 10, 1995

[54] DEVICE FOR ADDING ADDITIVES TO LIQUID FUELS

[75] Inventors: Walter Thunker, Bottrop; Gabriele Lohmann, Lunen; Arnim Marschewski, Gelsenkirchen; H. J. Langer, Remseck; Roland Schulte, Leutenbach, all of Germany

[73] Assignee: Chemische Betriebe Pluto GmbH, Herne, Germany

[21] Appl. No.: 277,435

[22] Filed: Jul. 18, 1994

[30] Foreign Application Priority Data

Jul. 17, 1993 [DE] Germany ............... 43 24 046.1

[51] Int. Cl.$^6$ .................. F02M 25/00; B60K 15/04; C10L 1/30
[52] U.S. Cl. ............... 123/1 A; 220/86.2; 222/190
[58] Field of Search ............ 123/1 A; 220/DIG. 33, 220/86.1, 86.2; 222/610, 190

[56] References Cited

U.S. PATENT DOCUMENTS

| | | | |
|---|---|---|---|
| 3,816,083 | 6/1974 | Patterson | 123/1 A |
| 4,135,404 | 1/1979 | Butler, Jr. | 220/86.2 |
| 4,971,118 | 11/1990 | Cluff | 123/1 A |
| 5,235,936 | 8/1993 | Kracklauer | 123/1 A |

FOREIGN PATENT DOCUMENTS

| | | | |
|---|---|---|---|
| 531062 | 7/1955 | Italy | 222/190 |
| 8204463 | 12/1982 | WIPO | 123/1 A |

*Primary Examiner*—Henry C. Yuen
*Assistant Examiner*—Erick Solis
*Attorney, Agent, or Firm*—Antonelli, Terry, Stout & Kraus

[57] ABSTRACT

A device for direct addition of solid additives to fuels for internal combustion engines. In order to ensure a concentration of the solid additive in the fuel which is as constant as possible, the device has a cartridge at least partially filled with the solid additives and at least partially permeable to the fuel. The cartridge is located in a portion of the filling neck of a fuel tank.

14 Claims, 2 Drawing Sheets

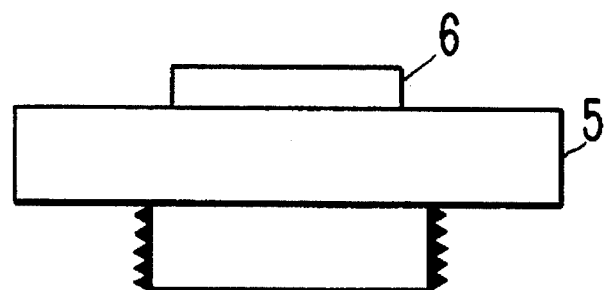
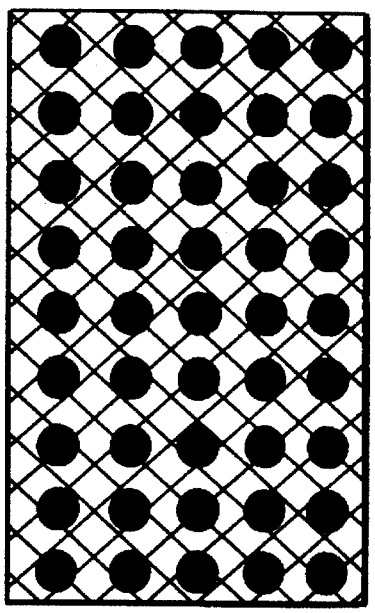
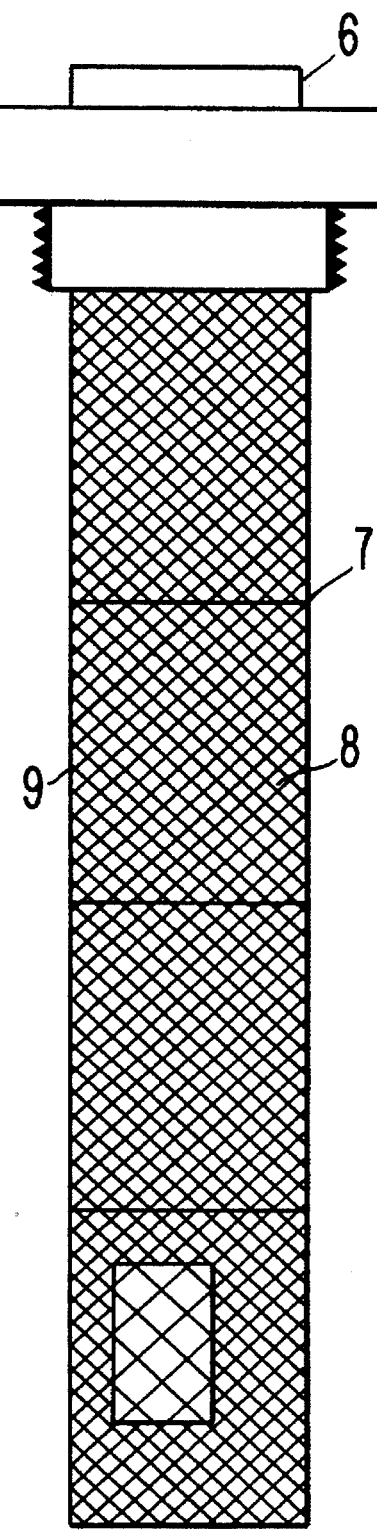

DEVICE FOR ADDING ADDITIVES TO LIQUID FUELS

FIELD OF INVENTION

This invention relates to a device for direct addition of additives to liquid fuels, said additives containing solids that are soluble in the fuel, as well as a corresponding method of addition.

The advantages of adding additives to fuel, especially improvement or intensification of the combustion of the fuel, have been known to the individual skilled in the art for a long time. This applies both to firing systems operated with liquid fuels and to internal combustion engines, for example in motor vehicles. One known and very effective solid additive is ferrocene (note DE 25 02 307).

The advantages of fuels containing ferrocene, especially reduction of fuel consumption and exhaust pollution as well as removal or reduction of deposits containing carbon, have also been described in DE 3 801 947 in conjunction with gasoline engines with specially hardened seats for the exhaust valves and in DE 3 715 473 in connection with gasoline engines with non-specially-hardened seats for the exhaust valves and a regulated three-way catalyst system for the exhaust. In both of these publications, it is proposed either to add the additive (ferrocene) to the fuel directly in the corresponding concentration of the amounts recommended therein, with mixing, or to prepare a concentrate of dissolved ferrocene and then to add the required volume to the fuel to adjust the desired ferrocene concentration.

EP O 334 248 proposes addition of an additive to engine lubricating oil for Diesel engines with ferrocene. According to this publication the addition of an additive to engine lubricating oil is an advantageous alternative to adding an additive to Diesel fuel or to an additional dispensing device.

SUMMARY OF THE INVENTION

The goal of the invention is to provide a device of the type heretofore described that makes it possible to add a solid additive to fuel so that the solid additive may be added to any fuel, not when the fuel is manufactured but only during its final storage, in other words relatively shortly before the fuel is burned. In addition, a method for direct addition of a solid additive to liquid fuels is to be provided.

This goal is achieved according to the invention by a device for direct addition of solids as an additive to liquid fuels, said solids being soluble in the fuel, characterized by the fact that a cartridge filled at least partially with additive solids and at least partially permeable to the fuel, is located in a tank filling neck.

With the aid of this device it is possible to add a solid additive to the fuel when filling the motor vehicle with fuel, and thereby to achieve the advantages mentioned at the outset, namely reducing consumption, intensifying combustion, and reducing pollutants. During the final storage of the fuel, in other words when the last tank is filled before the fuel is used, i.e. burned, the device according to the invention adds the additive to the fuel. An important advantage is the simple procedure to be followed by the user, since for the user, filling a tank with the device according to the invention does not differ from filling a tank without the device, with which procedure the user is very familiar.

During the filling process, the fuel added through the filling neck passes through the cartridge placed in the neck, thereby dissolving a portion of the solid additive located in the cartridge. In this manner, adding an additive to the fuel whose concentration remains relatively constant is ensured.

For example, the cartridge can be mounted on a stub or pipe extension located in the curve of the filling neck (note FIG. 1 of the drawings). An arrangement of this kind depends in individual cases on the shape of the filling neck. The individual skilled in the art will note that the design and geometric features are such that firstly sufficient fuel passes through the cartridge when filling the tank to ensure sufficient addition of additive, and secondly no clogging effects occur as a result of resistance to flow, which for example would cause the nozzle to shut off automatically.

Preferably the cartridge is replaceable, in other words it can be removed from the filling neck. The cartridge can be suspended in the filling neck and fastened only by a hook for example or can be connected firmly with the filling neck by a screw thread or bayonet connection. Preferably the cartridge can be constructed so that it can be opened to fill it with the solid additive material and then closed again.

Preferably the jacket of the cartridge, made cylindrical for example, can be made of a solid material, e.g. a metal that has window-like openings that are provided with screen inserts. These windows provided with screen inserts ensure that the cartridge can be traversed by the fuel. Screen inserts that have a mesh size of 100 to 1,000 µm, especially a 400 to 600 µm mesh, have been shown to be especially advantageous. At this mesh size, the fuel can flow through smoothly while larger solid particles that exceed the mesh size are retained.

In addition it has been found to be advantageous fox the solid additive material to be in the form of pills or pellets. Firstly this makes refilling the cartridge easier and secondly the shape of the solid ensures that sufficiently large spaces are available through which the fuel can flow unimpeded. Preferably pills or pellets are used with a diameter of 1 to 10 mm and especially 4 to 6 mm.

As already mentioned at the outset, ferrocene is an especially effective additive. The device according to the invention described above is also especially suitable for the use of ferrocene. This is particularly true when the ferrocene, as likewise described above, is in the form of spherical pills that preferably have a diameter of about 5 mm.

Advantageously the device according to the invention can be mounted on the fuel tanks of motor vehicles. In such fuel tanks, the tank is usually filled through the tank filling neck using a nozzle. Advantageously, the fuels are Diesel fuel or gasoline.

In addition the invention relates to a method for directly adding additives in solid form to liquid fuels, said solids being soluble in the fuel, introducing a cartridge filled at least partially with the solid additive and at least partially permeable to the fuel, into the filling neck and then filling the fuel tank through this neck. Special embodiments of the method are characterized by filling a fuel tank using the device according to the invention described above.

BRIEF DESCRIPTION OF THE DRAWINGS

The invention will be described hereinafter in greater detail with reference to FIGS. 1 and 2 of the accompanying drawings wherein:

FIG. 2A is a schematic view of the cartridge; and

FIG. 2B is a schematic enlarged view of a portion of the cartridge shown in FIG. 2A.

DETAILED DESCRIPTION OF THE INVENTION

Figure 1:
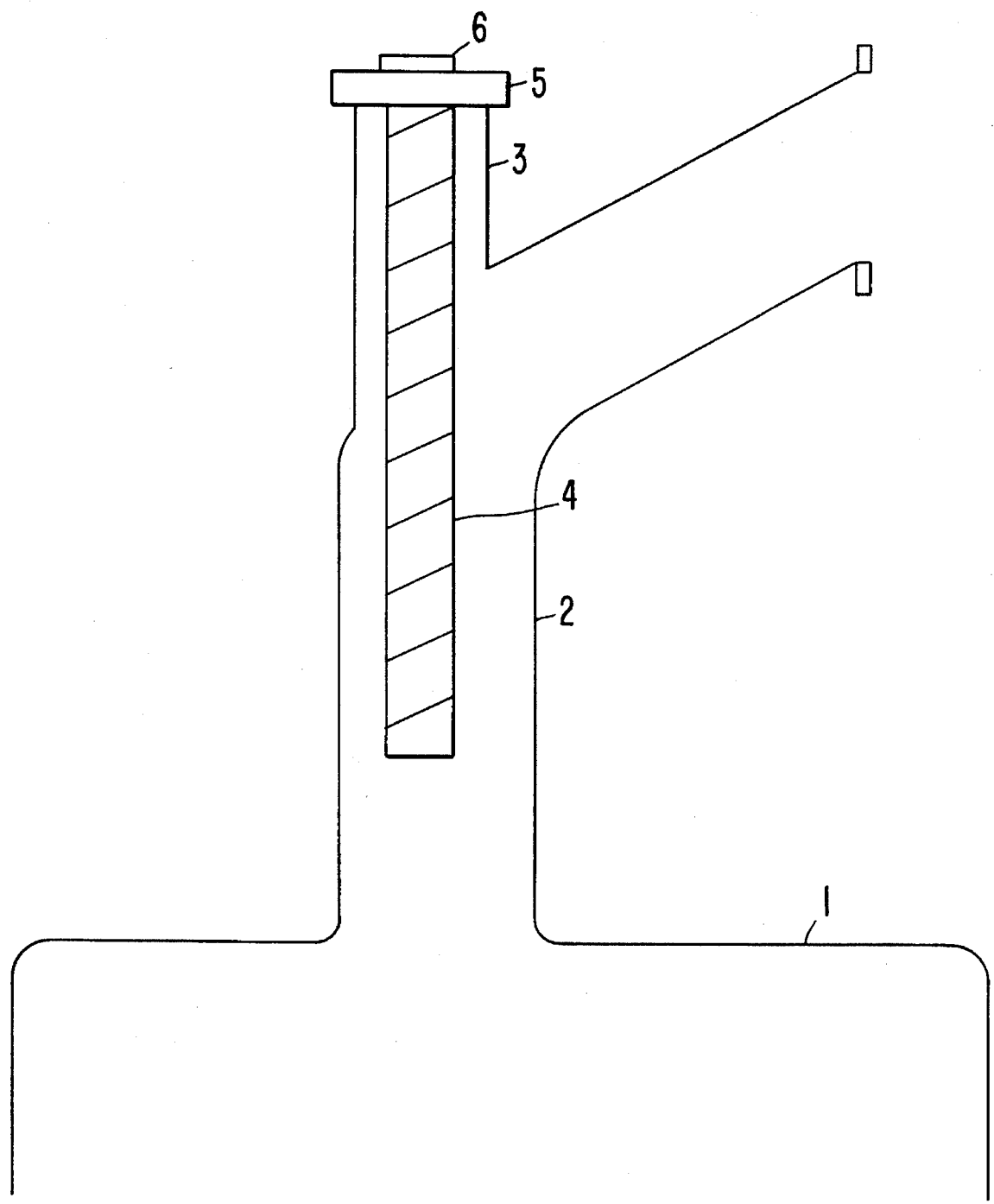
FIG. 1 is a schematic section through a tank filling neck with a stub mounted at the sides and a cartridge inserted.

FIG. 1 shows a curved tank filling neck 2 belonging, i.e. connected to a tank 1 with an opening pointing to the right, through which a nozzle can be inserted. A stub 3 is provided in the outer curve. A cartridge 4 is inserted through this stub 3 in filling neck 2. This cartridge 4 is fastened to a cover 5 which in turn tightly seals stub 3. Plug 6 is used in refilling the cartridge.

FIG. 2A shows a cartridge having a cylindrical jacket 7 that has window-like openings 8 provided with screen inserts 9. Cover 5 and plug (6) can each be provided with screw threads. Such cartridges are commercially available and are usually used as filter-cartridges, mostly made of plastic. The cylindrical jacket 7 functions as a frame to which the screen is fixed, i.e. adhered or welded. FIG. 2B shows the ferrocene pills schematically.

Embodiments of the Invention

An original tank of a motor vehicle was modified in the area of the filling neck in such fashion that it could accept a cartridge filled with ferrocene pills. The screw-in cartridge for this neck was made of a plastic frame having window-like openings provided with metal or plastic screen inserts. The mesh size of these screen inserts was about 500 μm. This cartridge was filled with ferrocene pills and screwed into the neck via a stub fitting. It was filled with 60 g of ferrocene. The pills with a diameter of about 5 mm were made by sintering pure ferrocene under a pressure of 2 t/cm$^2$.

The tank was filled at a gasoline pump with a DIN-ZVA nozzle with automatic shutoff. After each filling interval, a sample was taken from the tank. These samples were tested for iron using x-ray fluorescence analysis. The filling samples were compared with blind samples from the supply.

In these filling tests the influence of the throughputs and quality of the fuel were studied. The range of throughputs at public gasoline stations is between 5 and 50 l/min, and this range was adjusted by a suitable lock on the nozzle. Three measurement series were conducted at different throughput rates.

TABLE 1

| Throughput Rate | 7 liter/min | 22 liter/min | 44 liter/min |
|---|---|---|---|
| Ferrocene Content | 27–33 ppm | 30–36 ppm | 33–43 ppm |

It turns out that within a certain range of variation, a sufficiently accurate addition of additive takes place even though there is a slight tendency toward higher rates of addition of the additive at the higher throughput rates. The range of variation poses no problems for practical operation.

To investigate the influence of the fuel, three different Diesel fuel grades were tested (Table 2). The throughput volume corresponded to an average rate of 28 l/min. The specifications of the Diesel fuel (DF) are listed in Table 3.

TABLE 2

| Grade | HC-DF | HEL | DF |
|---|---|---|---|
| Ferrocene Content | 35 ppm | 33 ppm | 34 ppm |

TABLE 3

|  | HC-DF | HEL | DF |
|---|---|---|---|
| Density, 15° C. | 0.8356 g/ml | 0.8374 g/ml | 0.8306 g/ml |
| CP | 5° C. | 3° C. | −4° C. |
| CFPP | 4° C. | −12° C. | −18° C. |
| Sulfur | 0.9 ppm | <0.28 | <0.2% |
| C-aromatics | 12.4% | 13.8% | 14.9% |
| Cetane Index | 62.4 | 51.6 | 51.5 |
| Boiling Ranges °C. | 220–368 | 173–376 | 162–364 |

HC: Hydrocracker
HEL: Heating oil, light
CP: Cloud point
CFPP: Cold filter plugging point The results of this test (Table 3) show that the variations in fuels that are usual for refineries have no significant influence on the addition of ferrocene as an additive in this system.

The influence of the temperature parameter may be disregarded in view of the fact that most of the filling stations have underground tanks with a narrow temperature range (5° to 10° C.).

What is claimed is:

1. A device for direct addition of solid additives to liquid fuels for internal combustion engines with solid additives that are soluble in the fuel which comprises a cartridge mounted in a tank filling neck of the fuel tank, said cartridge being filled at least partially with solid additive material and being at least partially permeable to the fuel.

2. A device according to claim 1, wherein the cartridge is fastened in an interchangeable manner to the tank filling neck.

3. A device according to claim 1, wherein the cartridge has window-like openings provided with screen inserts.

4. A device according to claim 2, wherein the cartridge has window-like openings provided with screen inserts.

5. A device according to claim 3, wherein the screen inserts have a mesh size of 100 to 1,000 μm, especially 400 to 600 μm.

6. A device according to claim 4, wherein the screen inserts have a mesh size of 100 to 1,000 μm, especially 400 to 600 μm.

7. A device according to claim 1, wherein the cartridge has an opening that can be opened to refill the cartridge with solid additive material and then reclosed.

8. A device according to claim 1, wherein the solid additive material is in the form of pills.

9. A device according to claim 1, wherein the solid additive material is ferrocene.

10. A device according to claim 1, wherein the fuel is Diesel fuel or gasoline.

11. A device according to claim 1, wherein the tank filling neck comprises a neck for filling a tank of a motor vehicle using a nozzle.

12. A device according to claim 1, wherein the filling neck of the tank has a stub fitting connected to a curved portion of the neck, said stub fitting having a closeable opening for insertion of the cartridge and means for suspending the cartridge into the filling neck.

13. A method for direct addition of solid additives to liquid fuels with solid additives that are soluble in the fuel, which comprises inserting a cartridge, filled at least partially with the solid additives and at least partially permeable to the fuel, into a filling neck of a fuel tank and then supplying the fuel tank through this filling neck with the liquid fuel.

14. A method for direct addition of solid additive to liquid fuels with solids that are soluble in fuel, by filling a fuel tank using a device for direct addition of solid additives to liquid fuels for internal combustion engines with solid additives that are soluble in the fuel which comprises a cartridge mounted in a tank filling neck of the fuel tank, said cartridge being filled at least partially with solid additive material and being at least partially permeable to the fuel.

* * * * *

UNITED STATES PATENT AND TRADEMARK OFFICE
CERTIFICATE OF CORRECTION

PATENT NO. : 5,456,217
DATED : October 10, 1995
INVENTOR(S) : THUNKER, et al.

It is certified that error appears in the above-identified patent and that said Letters Patent is hereby corrected as shown below:

On the Title Page, Item

"[73] Assignees: Chemische Betriebe Pluto GmbH, Herne Germany"

should read:
--[73] Assignees: Chemische Betriebe Pluto GmbH, Herne, Mercedes-Benz AG, Stuttgart, both of Germany Signed and Sealed this Seventh Day of May, 1996

Attest:

BRUCE LEHMAN

Attesting Officer

Commissioner of Patents and Trademarks